United States Patent
Hoppe et al.

(10) Patent No.: US 8,899,198 B2
(45) Date of Patent: Dec. 2, 2014

(54) FASTENING ASSEMBLY OF A CAMSHAFT ADJUSTER

(75) Inventors: Jens Hoppe, Erlangen (DE); Ali Bayrakdar, Rothenbach/Pegnitz (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 55 days.

(21) Appl. No.: 13/505,042

(22) PCT Filed: Oct. 28, 2010

(86) PCT No.: PCT/EP2010/066330
§ 371 (c)(1),
(2), (4) Date: Apr. 30, 2012

(87) PCT Pub. No.: WO2011/051378
PCT Pub. Date: May 5, 2011

(65) Prior Publication Data
US 2012/0210962 A1   Aug. 23, 2012

(30) Foreign Application Priority Data
Oct. 29, 2009   (DE) .......................... 10 2009 051 310

(51) Int. Cl.
| | |
|---|---|
| *F01L 1/34* | (2006.01) |
| *F01L 1/344* | (2006.01) |
| *F16D 1/108* | (2006.01) |
| *F16D 1/12* | (2006.01) |
| *F16B 39/26* | (2006.01) |
| *F16D 1/10* | (2006.01) |
| *F01L 1/047* | (2006.01) |

(52) U.S. Cl.
CPC ........... *F01L 1/344* (2013.01); *F16D 2001/103* (2013.01); *F01L 1/3442* (2013.01); *F01L 2001/0475* (2013.01); *F16D 1/108* (2013.01); *F16D 1/12* (2013.01); *F16B 39/26* (2013.01); *F01L 2001/34433* (2013.01)
USPC ....................... 123/90.17; 123/90.15; 464/160

(58) Field of Classification Search
CPC .................... F01L 1/3442; F01L 2001/34433; F16D 1/12; F16D 1/108
USPC ............................. 123/90.17, 90.15; 464/160
See application file for complete search history.

(56) References Cited

U.S. PATENT DOCUMENTS

| | | | |
|---|---|---|---|
| 3,721,220 A | 3/1973 | Garcea | |
| 6,053,138 A * | 4/2000 | Trzmiel et al. ............. | 123/90.17 |
| 2009/0145386 A1 | 6/2009 | Ushida | |

FOREIGN PATENT DOCUMENTS

| | | |
|---|---|---|
| DE | 19908934 | 9/2000 |
| DE | 19955507 | 6/2001 |

(Continued)

*Primary Examiner* — Ching Chang
(74) *Attorney, Agent, or Firm* — Volpe and Koenig, P.C.

(57) ABSTRACT

A fastening assembly for fastening a camshaft adjuster to a camshaft, having an input part that can be brought into driving engagement with a crankshaft, an output part that is non-rotationally connected to the camshaft, the output part being mounted rotationally adjustably with respect to the input part, and a control mechanism, by which a rotational angle position between the input and output parts can be adjusted. The output part is provided with a central axial opening penetrated by an end section of the camshaft. The end section has a thread-bearing thread section, which is screwed together with a tension nut acting on the output part such that the output part and the camshaft are axially loaded for the non-rotational connection thereof. To this end, the tension nut is elastically loaded in the axial direction or relieved in the axial direction.

13 Claims, 10 Drawing Sheets

(56) References Cited

FOREIGN PATENT DOCUMENTS

| | | |
|---|---|---|
| DE | 19616973 | 11/2003 |
| DE | 19727180 | 12/2003 |
| DE | 102004038681 | 6/2006 |
| DE | 102005013141 | 9/2006 |
| DE | 202005008264 | 9/2009 |
| EP | 0924392 | 6/1999 |
| EP | 1596040 | 11/2005 |
| EP | 1596041 | 11/2005 |
| FR | 2582064 | 5/1985 |
| GB | 2156469 | 10/1985 |
| WO | 8909344 | 10/1989 |
| WO | 2006039966 | 4/2006 |

* cited by examiner

FASTENING ASSEMBLY OF A CAMSHAFT ADJUSTER

FIELD OF THE INVENTION

The invention lies in the technical field of internal combustion engines and relates to a fastening arrangement for fastening a camshaft adjuster to a camshaft. The camshaft adjuster comprises a drive part that can be brought into drive connection with a crankshaft, a driven part that can be locked in rotation with the camshaft and is supported so that it can rotate relative to the drive part, and also an actuating mechanism that can adjust a rotational angle position between the drive part and the driven part. The driven part is locked in rotation with the camshaft by a central threaded connection.

BACKGROUND

In internal combustion engines with mechanical valve control, gas exchange valves are actuated by cams of a camshaft-driven camshaft, wherein the control times of the valves can be determined by the arrangement and shape of the cams. Changing the rotational angle position (phase position) between the crankshaft and camshaft can influence the control times of the valves, wherein advantageous effects, such as reducing fuel consumption and pollutant generation can be achieved. For a long time, the use of special devices has been known for adjusting the phase position between the crankshaft and camshaft, wherein these devices have usually been designated "camshaft adjusters."

In general, camshaft adjusters comprise a drive part in drive connection with the crankshaft and a camshaft-fixed driven part, as well as an adjustment mechanism that is connected between the drive part and driven part for the transfer the torque from the drive part to the driven part and enables adjustment and fixing of the phase position between these two parts. In the case of a hydraulic adjustment mechanism, at least one pair of counteracting pressure chambers is provided between the drive part and driven part and this pair of chambers can be selectively charged with pressurized medium, in order to rotate the drive part and driven part relative to each other and to cause a change in the phase position between the crankshaft and camshaft. Hydraulic camshaft adjusters are described in detail, for example, in publications DE 202005008264 U1, EP 1596040 A2, DE 102005013141 A1, DE 19908934 A1, and WO 2006/039966 of the applicant.

Hydraulic adjustment mechanisms conventionally comprise an electronic control device that regulates the feed and discharge of pressurized medium by means of an electromagnetically activated control valve on the basis of the current operating state of the internal combustion engine. Typically, the control valves comprise a cylindrical valve housing and a control piston that can be displaced axially in the interior of the valve housing and can be displaced by an electromagnetically moveable push rod against the spring force of a restoring spring element. Such control valves are well known as such and are described in detail, for example, in the German Patent DE 19727180 C2, the German Patent DE 19616973 C2, and also the European Patent Application EP 1 596 041 A2 of the applicant.

In one common design, the driven part of the camshaft adjuster is provided with a central axial opening that is penetrated by a central screw that is screwed into an end-side threaded opening of the camshaft. The driven part and the camshaft are connected to each other in a non-positive manner (rotationally locked) by the central screw. Such a fastening of the camshaft adjuster on the camshaft is shown, for example, in the German Laid Open Patent Application DE 102004038681 A1.

As is known to someone skilled in the art, it is typical for hydraulic camshaft adjusters that the valve housing of the control valve also takes over the function of the central screw, so that the driven part is locked in rotation with the camshaft by the control valve.

From DE 19955507 C2, an alternative fastening of the camshaft adjuster by a central screw connection to the camshaft is further known in which a clamping nut is screwed on a screw shaft connected to the camshaft, wherein the driven part of the camshaft adjuster is clamped axially with a flange part of the screw shaft.

SUMMARY

Accordingly, the objective of the present invention consists in providing the ability to fasten the camshaft adjust using a central screw connection to the camshaft, wherein the invention advantageously refines the known central screw connections.

This and other objectives are met according to the proposal of the invention by a fastening arrangement for fastening a camshaft adjuster to a camshaft with the features of the independent claim. Advantageous constructions of the invention are given by the features of the subordinate claims.

According to the invention, a fastening arrangement is shown for fastening a camshaft adjuster by a central screw connection to a camshaft. The fastening arrangement comprises a camshaft adjuster with a drive part that can be brought into drive connection with a crankshaft, a driven part that is locked in rotation with the camshaft and is supported so that it can rotate relative to the drive part, as well as an especially hydraulic adjustment mechanism through which a rotational angle position can be selectively adjusted between the drive part and driven part. Conceivable are also embodiments in which an electromechanical adjustment mechanism is provided, as described, for example, in DE 10 2004 038 681 A1.

In the fastening arrangement according to the invention, the driven part is provided with a central axial opening that is penetrated by an end section of the camshaft. The end section can have an integral construction with the camshaft or could be a separate component that is locked in rotation with the camshaft. Here, the end section of the camshaft has a thread-bearing threaded section that is screwed with a counter thread of a clamping nut loading the driven part so that the driven part and the camshaft are clamped in the axial direction to provide a rotationally fixed connection. Here, the clamping nut is loaded elastically in the axial direction or releases tension in the axial direction in the clamped state, so that loosening or detachment of the clamping nut is effectively counteracted.

According to the invention, loosening or detachment of the clamping nut caused by setting the central screw connection can be advantageously counteracted. In this way it is guaranteed that the camshaft adjuster clamped in the axial direction to the camshaft by the clamping nut remains locked in rotation in a desired installation position with the camshaft, wherein reduction of the axial forces acting between the clamping nut and driven part on one side and between the driven part and camshaft on the other side are counteracted. This is especially important when the phase position of the drive part and driven part can be adjusted by a hydraulic adjustment mechanism. For this adjustment, a control valve for controlling pressurized medium is usually arranged in a cavity of the camshaft. The connections of this control valve should be aligned as exactly as possible with the connections of the driven part, in order to guarantee efficient pressurized medium transport.

The camshaft adjuster according to the invention can involve, in particular, a hydraulic rotary piston adjuster that comprises an outer rotor that can be brought into drive connection with the crankshaft and an inner rotor locked in rotation with the camshaft. Here, the inner rotor is supported in a concentric arrangement with respect to a common rotational axis so that it can be rotated relative to the outer rotor, wherein its rotational angle position relative to the outer rotor can be adjusted by at least one hydraulic adjustment mechanism comprising a pair of pressure chambers acting against each other.

In one advantageous construction of the fastening arrangement according to the invention, the driven part is clamped by the clamping nut in the axial direction with or against a support surface formed by the camshaft, wherein, between the clamping nut loading the driven part and the driven part, an elastically deformable body is arranged by which the clamping nut is elastically loaded. The elastically deformable body can be connected rigidly, in particular, to the clamping nut. Advantageously, the elastically deformable body is made from spring steel, wherein it can be ensured that the force necessary for the axial clamping of the driven part and camshaft can be transmitted for a suitably elastic compression.

In another advantageous construction of the fastening arrangement according to the invention, the driven part is clamped by the clamping nut in the axial direction with a support surface formed by the camshaft, wherein the clamping nut itself is constructed as an elastically deformable body. This measure allows a realization of the fastening arrangement according to the invention that is especially simple and economical in industrial series production, wherein the clamping nut is elastically deformed in the tensioned state in the axial direction. For this purpose, the tensioning nut can be formed, for example, as an elastically deformable sheet-metal shaped part.

In another advantageous construction of the fastening arrangement according to the invention, the driven part is clamped by the clamping nut in the axial direction with a support surface formed by the camshaft, wherein the end section of the camshaft is provided with a deformation section that is arranged between the support surface and the threaded section and is constructed so that it is elastically deformed when the clamping nut is tightened. This measure also allows an especially simple and economical realization of the fastening arrangement according to the invention in industrial series production, wherein the tensioning nut in the clamped state is loaded elastically in the axial direction in the clamped state by the deformation section. The deformation section of the camshaft can have, for this purpose, for example, a smaller wall thickness than adjacent camshaft sections.

In another advantageous construction of the fastening arrangement according to the invention, the driven part is clamped in the axial direction by the clamping nut with a support surface formed by the camshaft, wherein the driven part is provided with a deformation section that is adjacent to the clamping nut and is constructed so that it is deformed elastically when the clamping nut is tightened. This measure also allows an especially simple and economical realization of the fastening arrangement according to the invention in industrial series production, wherein the clamping nut is loaded elastically in the axial direction in the clamped state by the deformation section of the driven part.

In another advantageous construction of the fastening arrangement according to the invention, the driven part is clamped in the axial direction by the clamping nut with a support surface formed by the camshaft, wherein the end section of the camshaft is provided with a truncated-cone-shaped conical section that is arranged between the support surface and the threaded section and on which the driven part sits, wherein a friction element, for example, a friction disk, amplifying the friction is arranged between the clamping nut and the driven part. Tension relief of the clamped clamping nut through the conical section can be achieved by this measure, which acts against detachment or loosening of the clamping nut due to setting. Another safety against detachment or loosening of the clamping nut is achieved by the friction element.

In another advantageous construction of the fastening element according to the invention, the driven part is clamped in the axial direction by the clamping nut with a support surface formed by the camshaft, wherein the end section of the camshaft is provided with a truncated-cone-shaped conical section that is arranged between the contact surface and the threaded section and on which the driven part sits, wherein a connecting element connecting the clamping nut and the end section of the camshaft to each other in a rotationally locked manner is arranged. Through this measure, tension relief of the clamped clamping nut can advantageously be achieved by the conical section, which acts against detachment or loosening of the clamping nut caused by setting. Another safety against detachment or loosening of the clamping nut is achieved by the connecting element.

In another advantageous construction of the fastening arrangement according to the invention, the driven part is clamped in the axial direction by the clamping nut with a support surface formed by the camshaft, wherein the end section of the camshaft is provided with a conical section formed in the shape of a truncated cone and arranged between the support surface and the threaded section and sitting on the driven part, wherein a wedge ring held in a receptacle of the driven part in some sections is arranged between the clamping nut and the driven part. Through this measure, tension relief of the clamped clamping nut can be advantageously achieved by the conical section, which counteracts a detachment or loosening of the clamping nut caused by setting.

It is understood that the above constructions of the fastening arrangement according to the invention could be provided alone or in various combinations.

In the above constructions of the invention, it can be advantageous if the adjustment mechanism comprises a hydraulic control valve that is held in a cavity of the end section of the camshaft and has a valve housing and a control piston held so that it can be displaced in in the axial direction in this valve housing, wherein the valve housing is secured in the axial direction by a securing ring held in a ring groove of the end section.

In the above constructions of the invention, it can be further advantageous if the adjustment mechanism comprises a hydraulic control valve that is held in a cavity of the end section of the camshaft and has a valve housing and a control piston held so that it can be displaced in the axial direction in this valve housing, wherein the valve housing is secured in the axial direction by a radial collar formed on the clamping nut.

Another aspect of the invention relates to a fastening arrangement of a camshaft adjuster with a drive part that can be brought into drive connection with a crankshaft, a driven part supported so that it can rotate relative to the drive part, and also a hydraulic adjustment mechanism that can adjust a rotational angle position between the drive part and driven part. Here, the driven part is provided with a central axial opening penetrated by an end section of the camshaft, wherein the driven part is welded with the camshaft. In addition, the hydraulic adjustment mechanism comprises a control valve that is held in a cavity of the end section of the camshaft and has a valve housing and a control piston held so that it can be displaced in the axial direction in this valve housing, wherein the valve housing is secured in the axial direction by a securing ring held in a ring groove of the end section. This aspect of the invention allows, at the same time, a reliable and secure, rotationally locked connection of the driven part to the camshaft adjuster.

The invention also extends to an internal combustion engine provided with at least one fastening arrangement as described above for a camshaft adjuster.

BRIEF DESCRIPTION OF THE DRAWINGS

The invention will now be explained in more detail with reference to several embodiments, wherein reference is made to the accompanying drawings. Elements that are identical or that have identical actions are designated in the drawings with the same reference numbers. Shown are.

DETAILED DESCRIPTION OF THE PREFERRED EMBODIMENTS

In the figures, different embodiments of the fastening arrangement according to the invention with a rotary piston adjuster for adjusting a relative rotational angle position between the crankshaft and camshaft are shown schematically.

Figure 1:
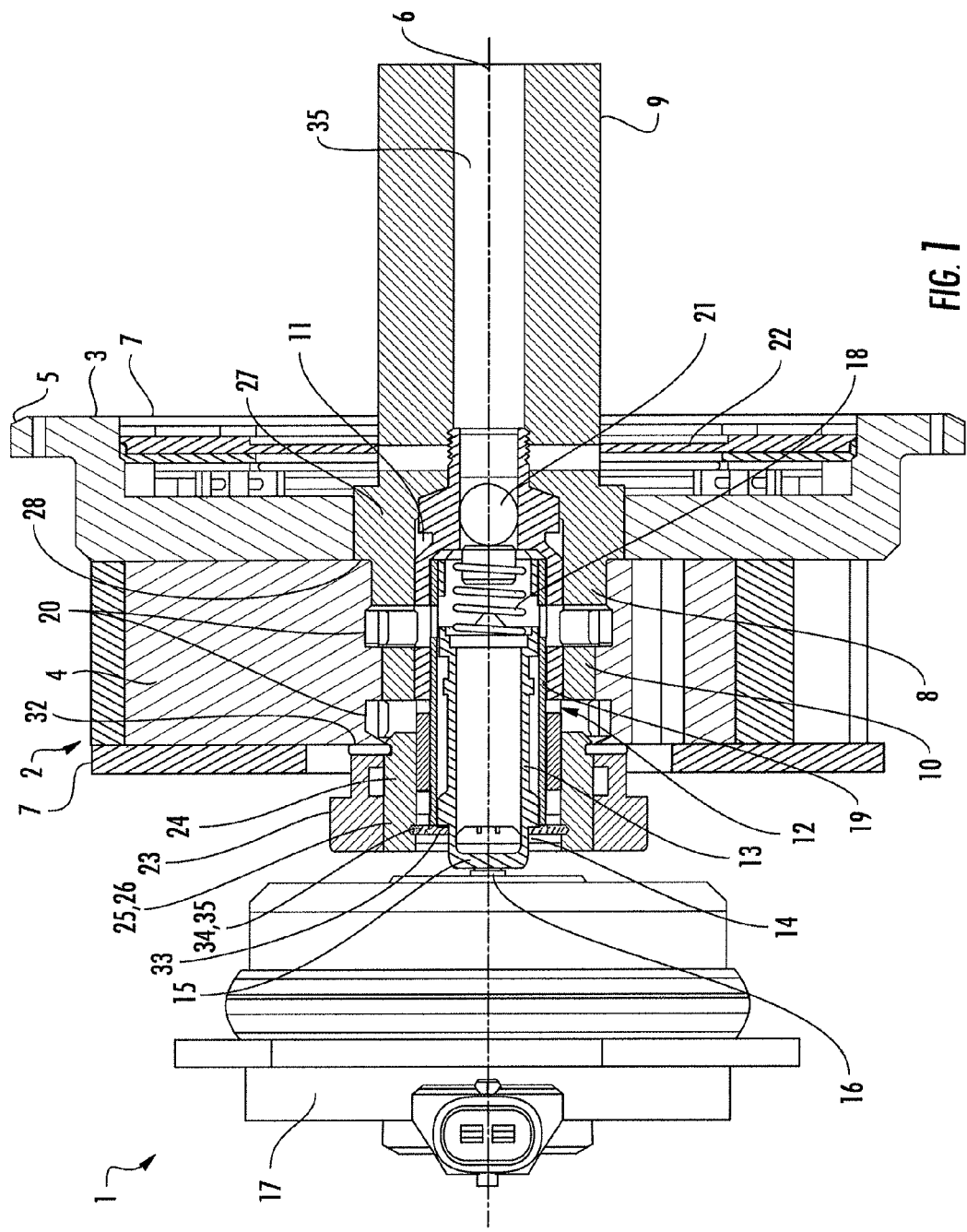
FIG. 1 is a radial section view of an embodiment of the fastening arrangement according to the invention in which an elastically deformable body is formed on the clamping nut.
Figure 2:
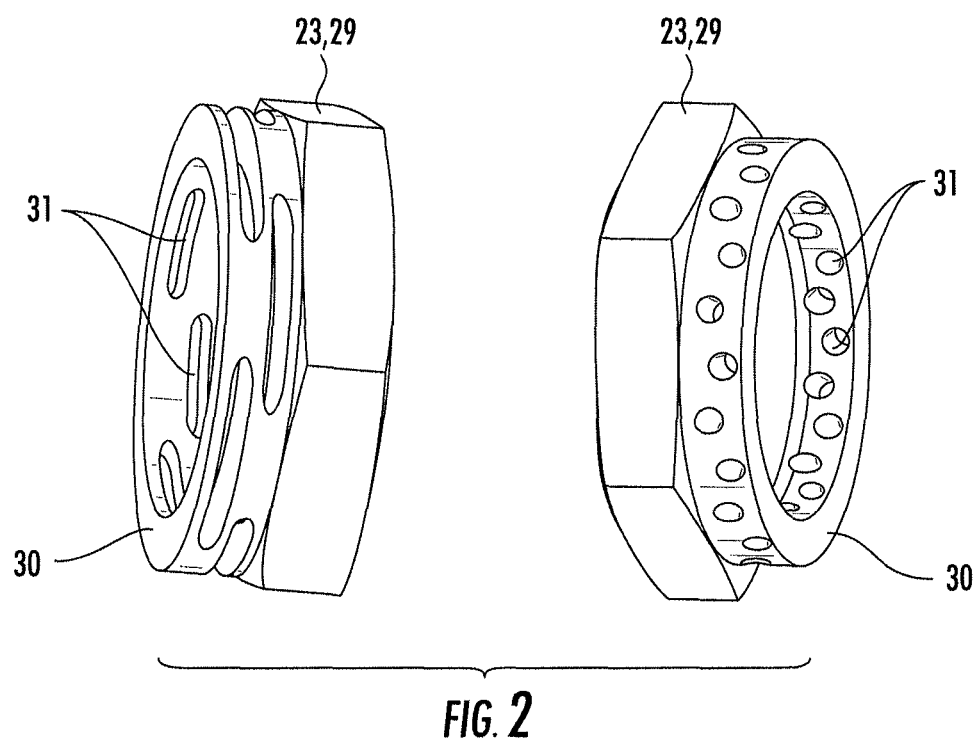
FIG. 2 shows two embodiments of the clamping nut of the fastening arrangement of FIG. 1.

First, FIGS. 1 and 2 will be considered, in which an embodiment of the fastening arrangement according to the invention is shown. Accordingly, the fastening arrangement designated overall with the reference number 1 comprises a hydraulic rotary piston adjuster 2 that has, as a drive part, an outer rotor 3 that can be brought into drive connection with a (not shown) crankshaft by means of a gearwheel 5 and a (not shown) gear train and, as a driven part, an inner rotor 4 arranged so that it can rotate relative to the outer rotor 3, wherein the outer rotor and inner rotor are arranged concentrically around a common rotational axis 6. In the radial intermediate space between the outer rotor and inner rotor, a plurality of pressure spaces are formed into each of which extends a vane connected to the inner rotor 4, by which each pressure space is divided into a pair of pressure chambers acting against each other. Through selective pressurization of, for example, the pressure chambers leading in the drive direction of the inner rotor 4 (pressure chambers "B") or the pressure chambers trailing accordingly (pressure chambers "A"), a rotational angle position between the inner rotor 4 and outer rotor 3 can be adjusted. At the same time, a desired rotational angle position can be maintained, for example, by hydraulic clamping of the vanes in the pressure chambers. The exact functioning of such a hydraulic rotary piston adjuster 2 has been known for a long time to someone skilled in the art, for example, from the publications mentioned above, so that a more detailed explanation does not have to be discussed here.

The outer rotor 3 forms a pressure-tight housing for the inner rotor 4, wherein the pressure spaces or pressure chambers are closed pressure-tight in the axial direction by side components 7 arranged on the end side. The outer rotor 4 is connected with the two side components 7 by axial fastening screws, which are not shown in more detail in FIG. 1.

The inner rotor 4 and the two side components 7 are provided with a central axial opening 8 that is penetrated by an end section 10 of a camshaft 9. Here, the inner rotor 10 sits on the camshaft 9 with a clearance fit. The end section 10 is provided with a cavity 11 in which a hydraulic control valve designated overall with reference number 12 is held for regulating flows of pressurized medium. The control valve 12 comprises a hollow cylindrical valve housing 13 in which a control piston 14 constructed as a hollow piston is held so that it can be displaced in the axial direction. A valve tappet 16 that is fastened rigidly to a (not shown) magnetic armature of an electromagnet 17 engages on the end surface 15 of the control piston 14 on the left in FIG. 1. When the magnetic armature is energized, the valve tappet 16 is offset in the axial direction and here adjusts the control piston 14 in the axial direction against the spring force of a helical compression spring 18. If the magnetic armature is not energized, the helical compression spring 18 sets the control piston 14 back into its starting position (in FIG. 1 at the left). The valve housing 13, the valve tappet 16, and a sleeve 19 surrounding the valve housing 13 are provided with a series of grooves and openings, in order to supply pressurized medium to or take them away from pressurized medium connections 20 of the inner rotor 4 communicating with the pressure chambers in a desired way according to the position of the control piston 14. As a rule, oil from the lubricant circuit is used as the pressurized medium that can be fed by means of pressurized medium channels 35. The exact functioning of the control valve 12 does not need to be discussed in more detail here.

The position of the control valve 12 is fixed by a securing ring 33 held in the cavity 11 in a ring groove 34. The securing ring 33 simultaneously forms an axial stop for the control piston 14.

Only as an additional point it shall be mentioned that the control valve 12 is provided with a non-return valve 21 that can prevent the pressurized medium paths from becoming empty when the internal combustion engine is stopped and can prevent pressure spikes and pulsations due to fluctuating torques of the camshaft from entering into the oil circuit.

In FIG. 1, a spiral spring 22 can also be seen by which the outer rotor and inner rotor 3, 4 can be moved, when the internal combustion engine is stopped, against the friction moment of the camshaft into a thermodynamic phase position (base position) that is favorable for starting the internal combustion engine.

A rotationally locked connection of the inner rotor 4 to the camshaft 9 is realized by axial clamping by a clamping nut 23. For this purpose, a threaded section 24 of the end section 10 of the camshaft 9 is provided with an outer thread 25 that is screwed together with the inner thread 26 of the clamping nut 23. For the axial clamping, the inner rotor 4 is pressed by the clamping nut 23 against a support surface 28 formed by a ring-shaped shoulder 27 of the camshaft 9.

As can be inferred, in particular, from FIG. 2, an annular ring part 30 is formed on the clamping nut 23 or on a head part 29 carrying the inner thread 26 and constructed in the form of a polygon and connected rigidly to the head part 29. The ring part 30 is here made, for example, from spring steel. It is provided with a plurality of round or, for example, oval openings 31 through which the ring part 30 obtains a certain amount of elastic deformability in the axial direction.

If the clamping nut 23 is screwed onto the thread section 24, the ring part 30 is led into contact against an end-side contact surface 32 of the inner rotor 4, wherein this is pressed against the support surface 28. Here, the ring part 30 is compressed elastically. If the screw connection settles in the course of time, then the elastically compressed ring part 30 can compensate for this setting loss, so that loosening or detachment of the clamping nut 23 is prevented.

Figure 3:
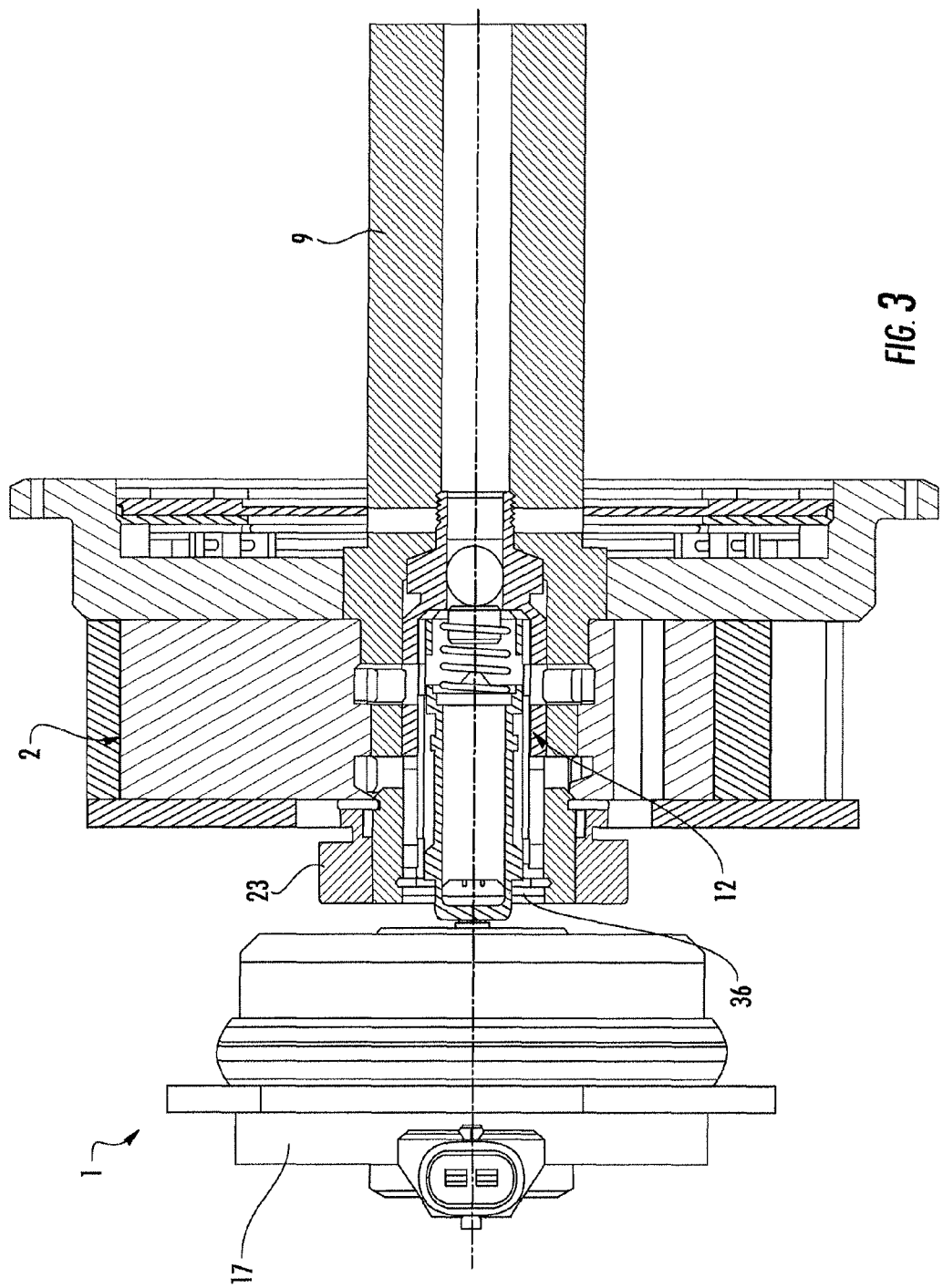
FIG. 3 is a radial section view of another embodiment of the fastening arrangement according to the invention in which an elastically deformable body is formed on the clamping nut.

Reference is now made to FIG. 3, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, the clamping nut 23 is provided with a radially inward directed collar 36 that is used for fixing the position of the control valve 12 instead of a securing ring. The collar 36 is simultaneously used as an axial stop for the control piston 14.

Figure 4:
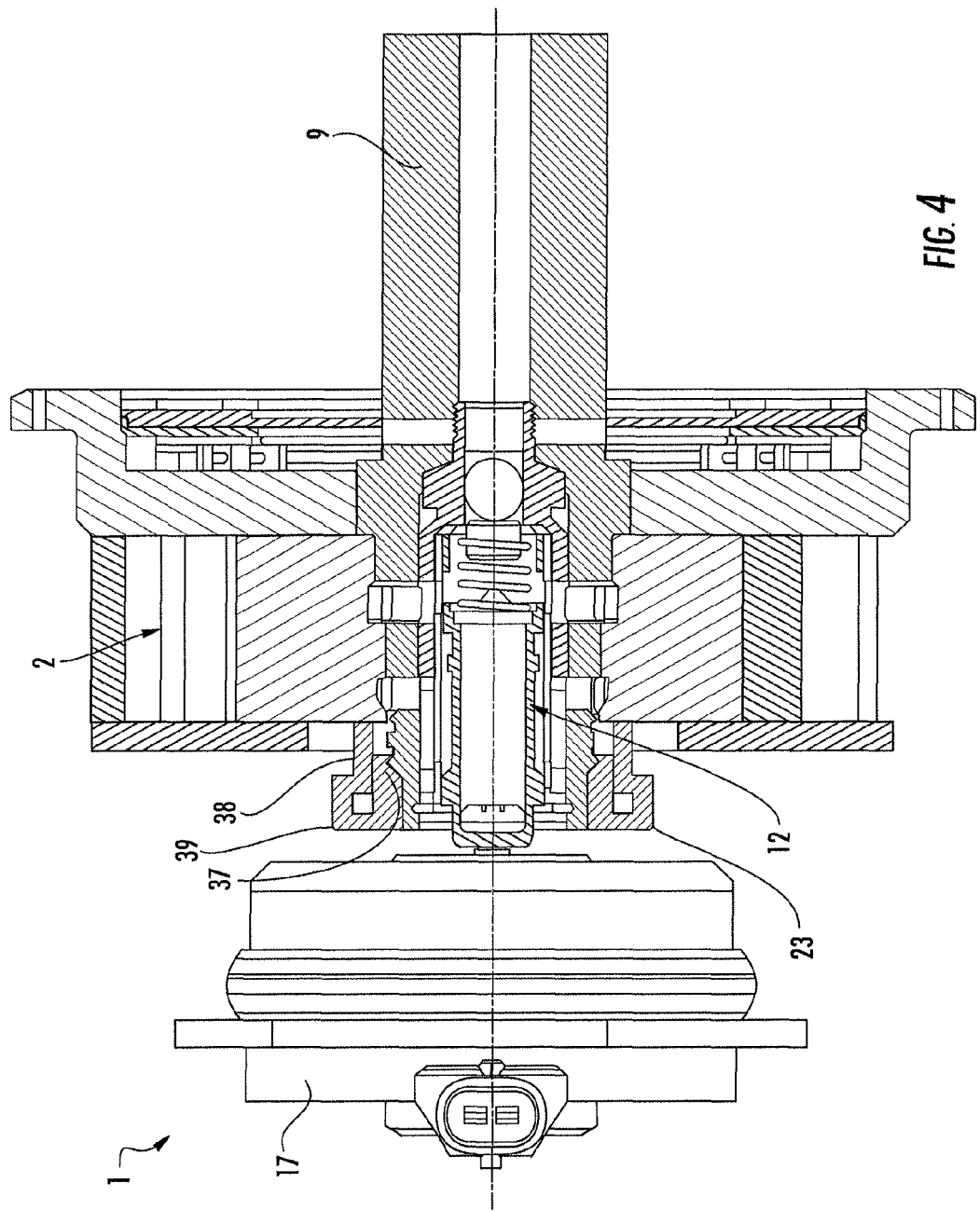
FIG. 4 is a radial section view of another embodiment of the fastening arrangement according to the invention in which the clamping nut is constructed as an elastically deformable body.

Reference is now made to FIG. 4, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, the clamping nut 23 is constructed as a sheet-metal shaped part and can be elastically deformed under axial clamping. For this purpose, it comprises an axial ring section 37 that carries the inner thread 26 and is connected to a support section 38 by a radial transition section 39. If the clamping nut 23 is screwed onto the outer thread 25 of the thread section 24, the support section 38 is led into contact against the contact surface 32, so that it is moved relative to the ring section 37 for further tightening of the clamping nut 23 under elastic deformation of the clamping nut 23. If the screw connection settles in the course of time, then the elastically deformable clamping nut 23 can compensate for this setting loss, so that detachment or loosening of the clamping nut 23 is prevented.

Figure 5:
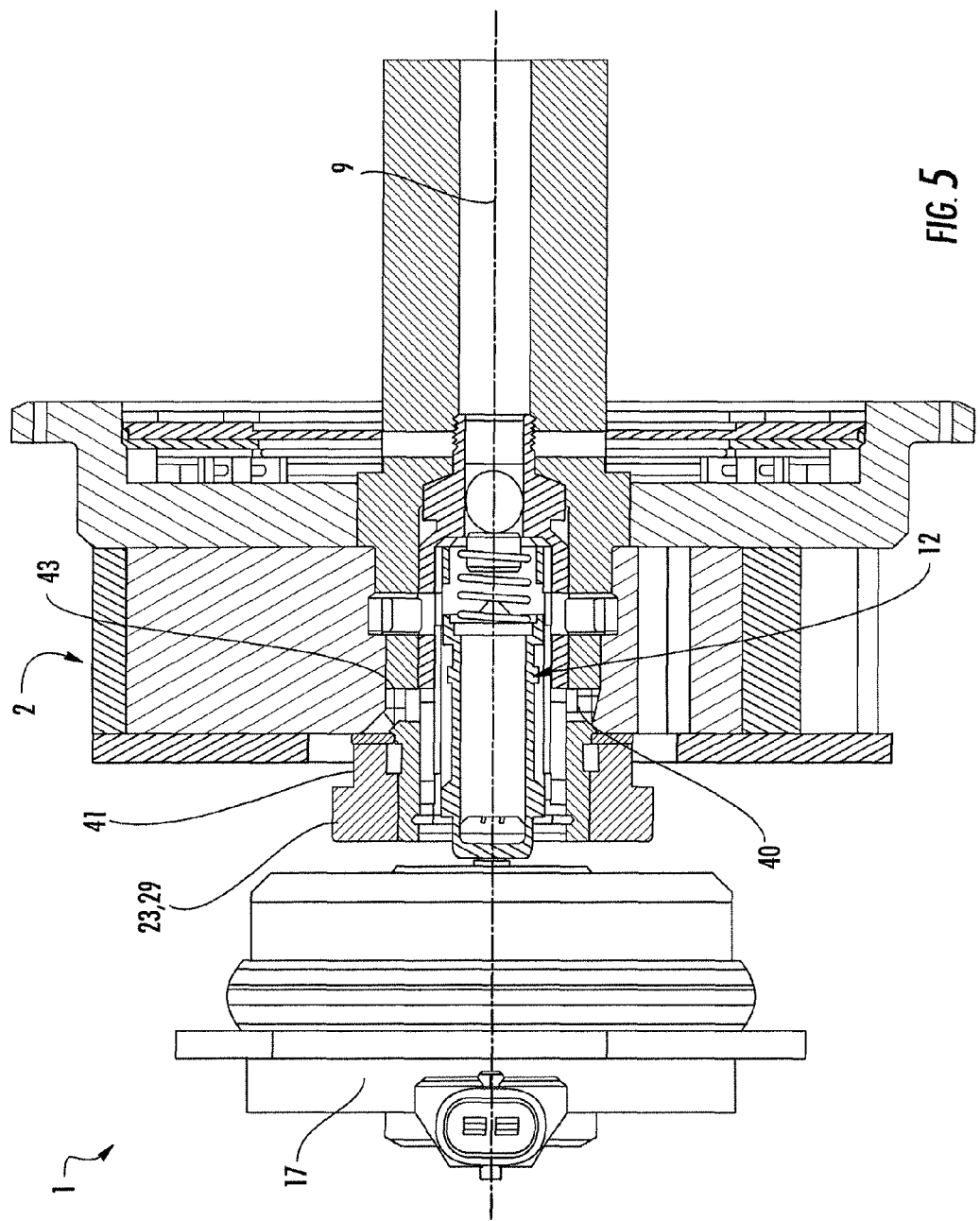
FIG. 5 is a radial section view of another embodiment of the fastening arrangement according to the invention in which the camshaft is provided with an elastically deformable section.

Reference is now made to FIG. 5, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, the clamping nut 23 is not connected to an elastically deformable ring part 30. Instead, a rigid clamping nut collar 41 connected rigidly to the head part is formed on the head part 29. With its end surface, the clamping nut collar 41 contacts the contact surface 32 via a friction disk 42. The friction disk 42 is used to block a detachment or loosening of the clamping nut 23. In this embodiment, the end section 10 of the camshaft 9 is provided with a (camshaft) deformation section 40 in the region between the threaded section 24 and the support surface 28. The deformation section 40 is formed by an outer, peripheral (camshaft) ring groove 43 that leads to a weakening of the end section 10 due to the reduced wall thickness. If the clamping nut 23 is screwed onto the outer thread 25 of the threaded section 24, the clamping nut collar 41 is led with its end surface into contact against the contact surface 32 of the inner rotor 4. When the clamping nut 23 is tightened, the deformation section 40 of the camshaft 9 is expanded elastically due to the axial clamping of the arrangement. If the screw connection settles in the course of time, the elastically deformable deformation section 40 can compensate this settling loss (through contraction), so that a detachment or loosening of the clamping nut 23 is prevented.

Figure 6:
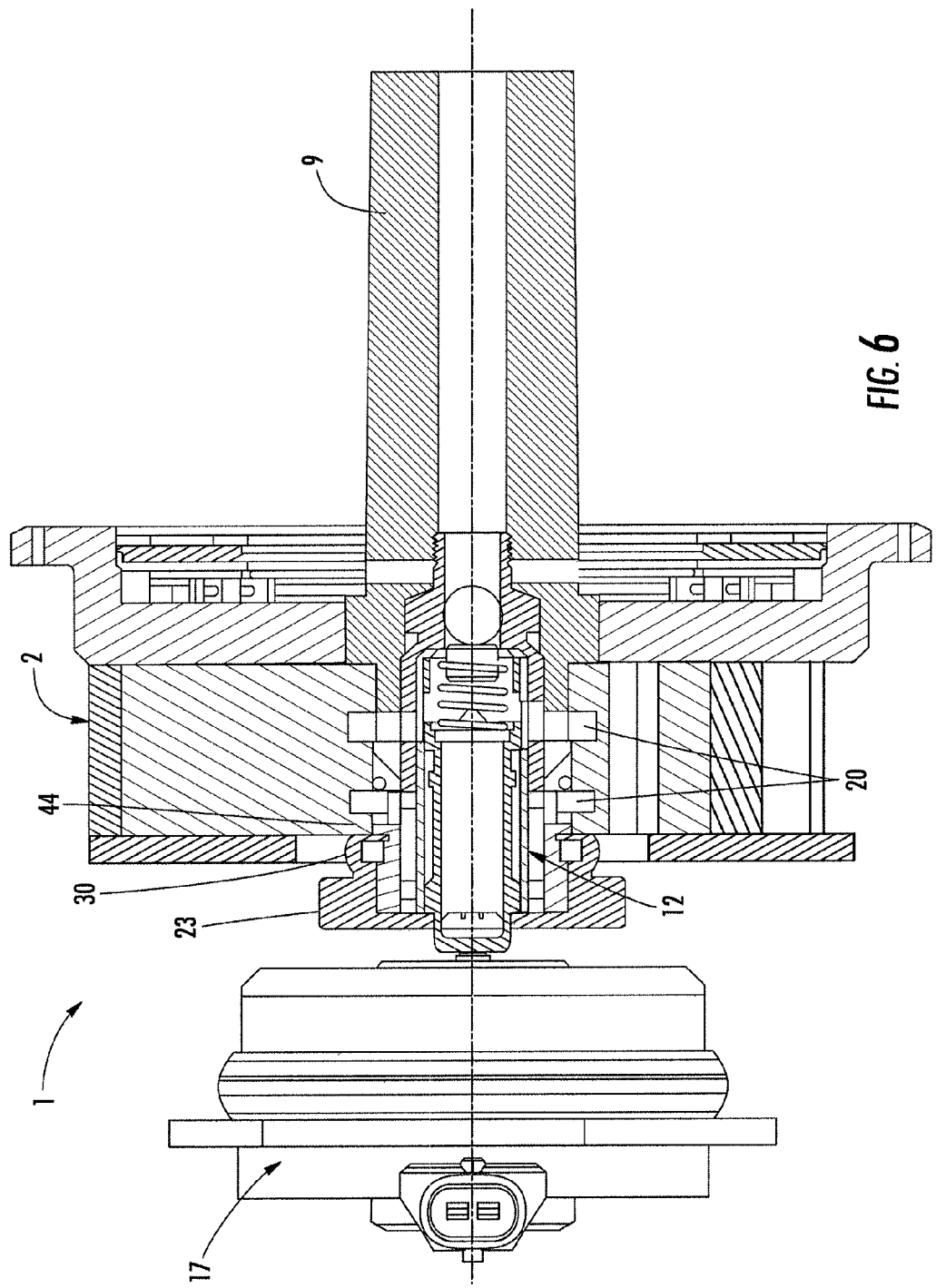
FIG. 6 is a radial section view of another embodiment of the fastening arrangement according to the invention in which the inner rotor is provided with an elastically deformable section.

Reference is now made to FIG. 6, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, a region of the inner rotor 4 that borders the ring part 30 and forms the contact surface 32 has an elastically deformable construction and is designated below as (inner rotor) deformation section 44. In the shown embodiment, the deformation section 44 is formed by an enlarged depth of the pressurized medium connection 20 constructed as a ring groove and adjacent to the contact surface 32. If the clamping nut 23 is screwed onto the outer thread 25 of the thread section 24, the ring part 30 is led with its end surface into contact against the contact surface 32 of the inner rotor 4. If the clamping nut 23 is tightened further, the deformation section 44 of the inner rotor 4 is compressed elastically due to the axial clamping of the arrangement. If the screw connection settles in the course of time, the elastically deformable deformation section 44 can compensate for this settling loss (through contraction), so that detachment or loosening of the clamping nut 23 is prevented.

Figure 7:
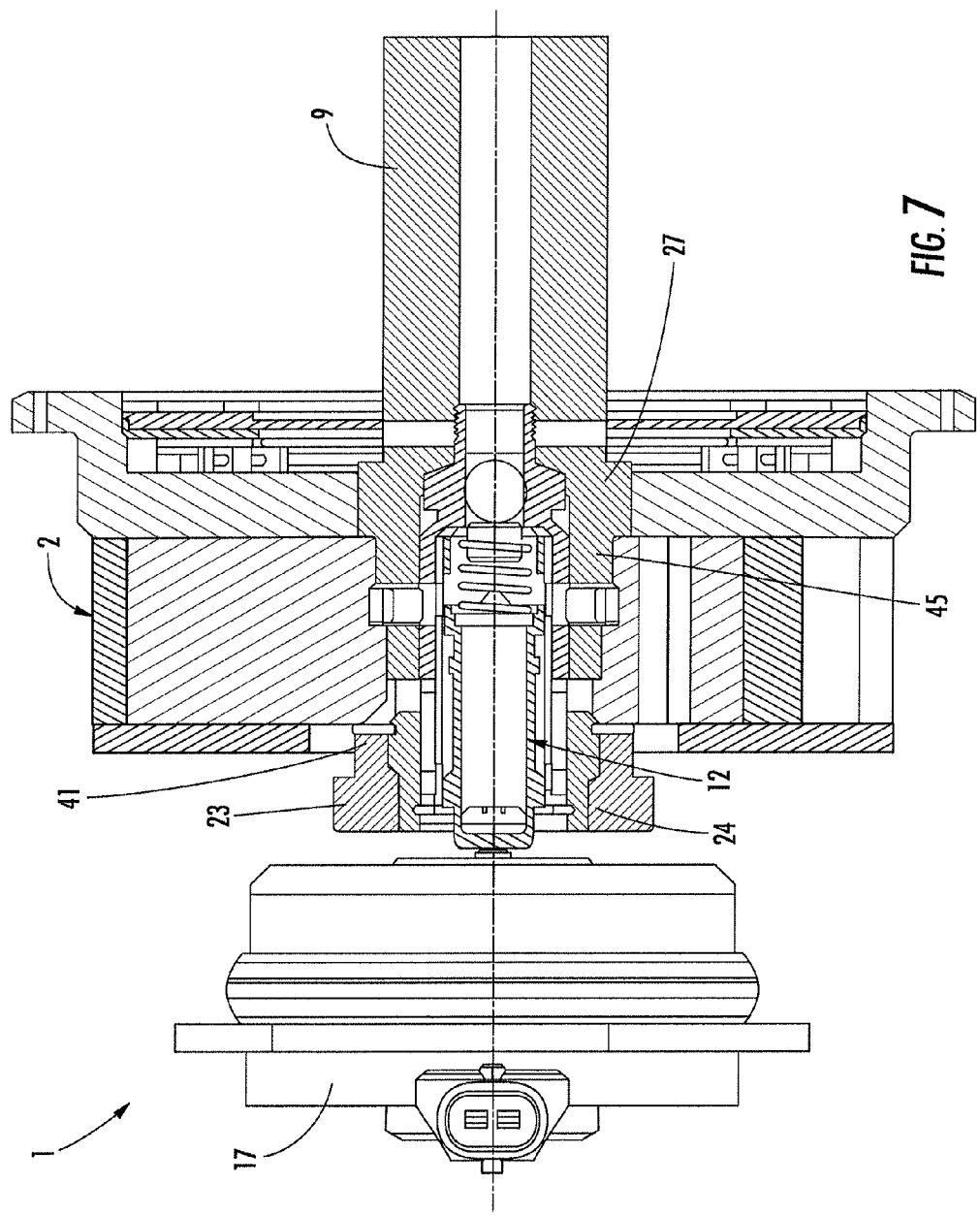
FIG. 7 is a radial section view of another embodiment of the fastening arrangement according to the invention in which the camshaft is provided with a truncated cone-shaped section.

Reference is now made to FIG. 7, wherein another embodiment of the fastening arrangement according to the invention is shown with reference to a radial section view. To avoid unnecessary repetition, only the differences to the embodiment shown in FIG. 5 will be explained and otherwise reference is made to the statements there.

Accordingly, the end section 10 is provided instead of a deformation section 40 between the thread section 24 and the support surface 28 with a truncated cone-like conical section 45. The axial opening 8 of the inner rotor 4 is constructed here with a force fit. If the clamping nut 23 is screwed onto the outer thread 25 of the threaded section 24, the clamping nut collar 41 is led with its end surface into contact against the contact surface 32 of the inner rotor 4. If the clamping nut 23 is tightened further, the inner rotor 4 is pressed against the support surface 28. In addition, the inner rotor 8 is clamped in the axial and radial directions on the axial opening 8 with the conical section 45. In this way, the clamping nut 23 is relieved of stress, which counteracts the settling of the screw connection.

Figure 8A:
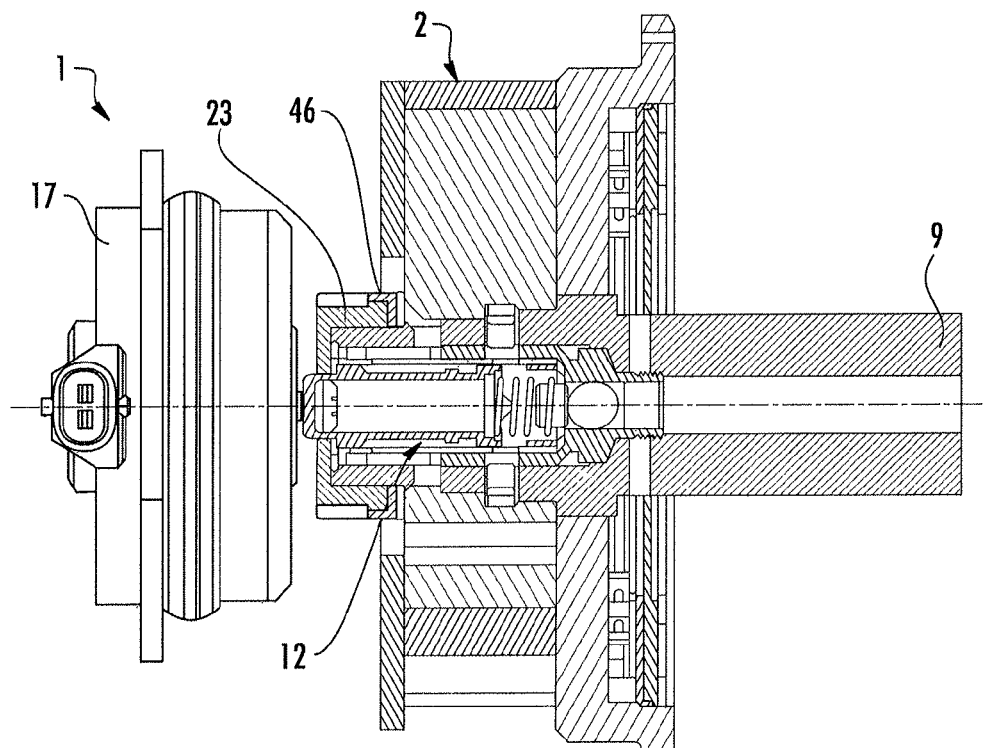
FIGS. 8A-8B are a radial section view (FIG. 8A) and also an axial front view (FIG. 8B) of another embodiment of the fastening arrangement according to the invention in which the camshaft is provided with a truncated cone-shaped section.
Figure 8B:
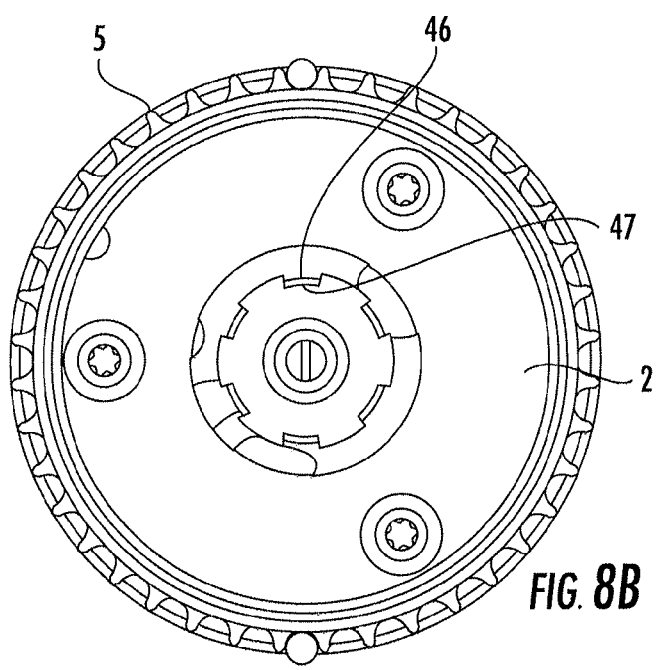

Reference is now made to FIG. 8, wherein another embodiment of the fastening arrangement according to the invention is shown with reference to a radial section view. To avoid unnecessary repetition, only the differences to the embodiment shown in FIG. 7 will be explained and otherwise reference is made to the statements there.

Accordingly, fastening tabs 46 distributed around the periphery are provided that are locked in rotation both with the end section 10 of the camshaft 9 and also with the clamping nut 23. For this purpose, the fastening tabs 46 are each held with one end in grooves of the end section 10 that are not shown in more detail in FIG. 8. With their other end, the fastening tabs 46 are held in tab receptacles 47 of the clamping nut 23. The fastening tabs 46 can be easily brought into the tab receptacles 47 by bending after the clamping nut 23 is tightened. Through the fastening tabs 46 connecting the clamping nut 23 and the camshaft 9 to each other in a rotationally fixed manner, detachment or loosening of the clamping nut 23 is counteracted.

Figure 9:
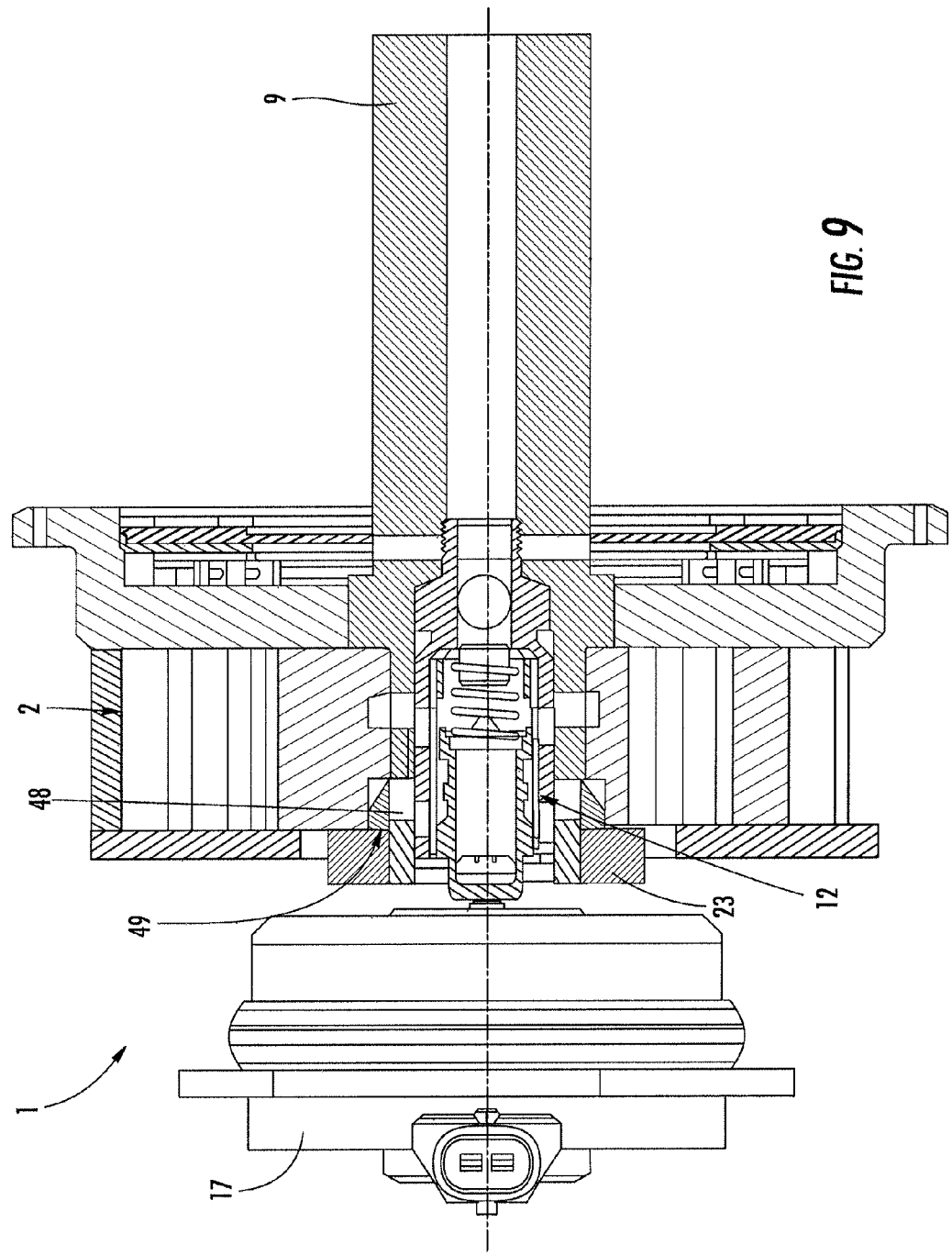
FIG. 9 is a radial section view of another embodiment of the fastening arrangement according to the invention in which a wedge ring interacting with a clamping nut is provided.

Reference is now made to FIG. 9, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, the clamping nut 23 is formed merely as a head part 29. In a wedge groove 48 formed in the region of the contact surface 32 of the inner rotor 4, an elastically deformable wedge ring 49 is partially held (in some sections). If the clamping nut 23 is screwed onto the outer thread 25 of the thread section 24, an end surface of the head part 29 is led into contact against the wedge ring 49, so that this is pressurized. If the screw connection settles in the course of time, the wedge ring 49 can compensate for this settling loss (through contraction), so that detachment or loosening of the clamping nut 23 is prevented. In addition, loosening of the screw connection is counteracted by the friction properties of the wedge ring 49.

Figure 10:
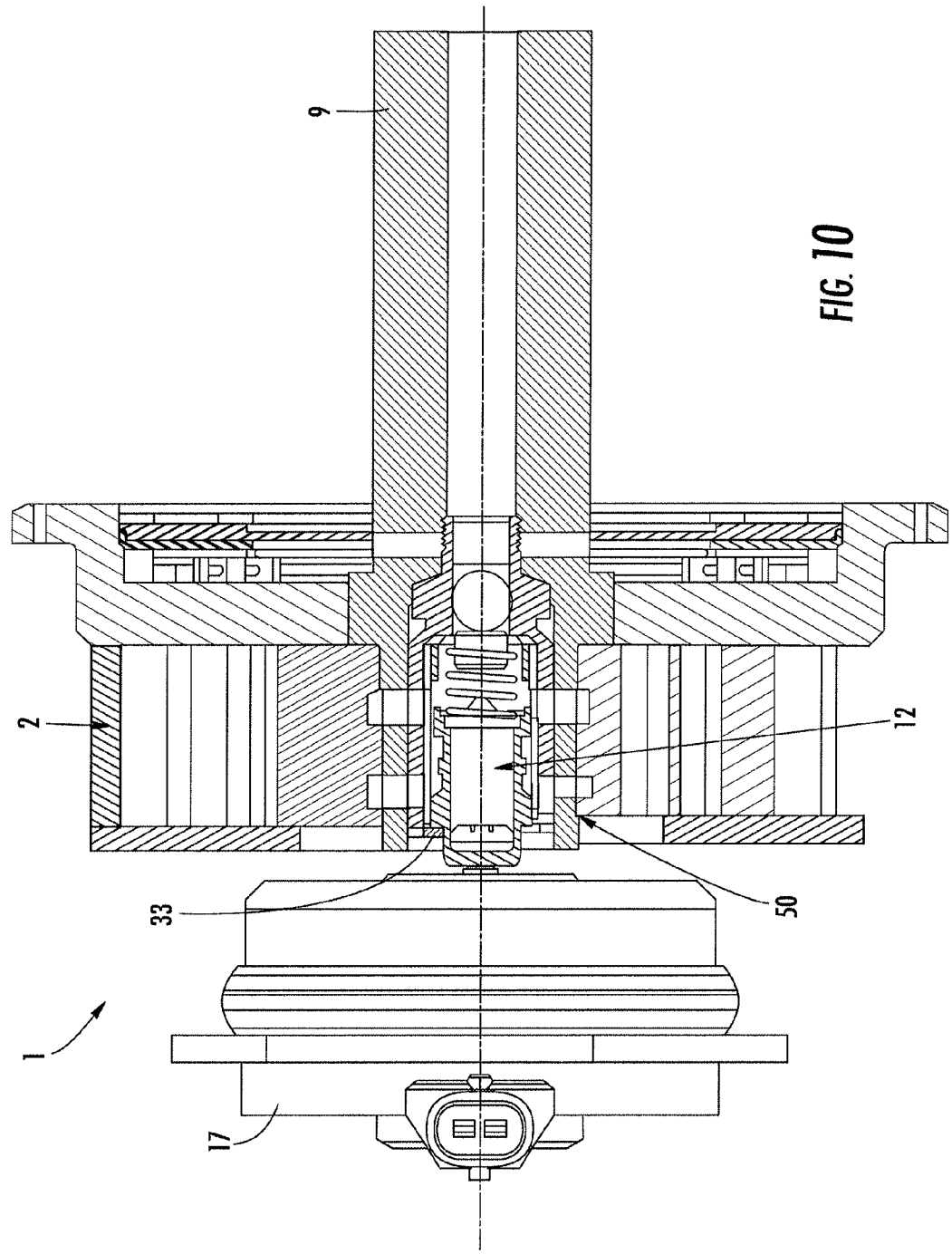
FIG. 10 is a radial section of a fastening arrangement according to the invention in which the driven part is welded to the camshaft.

Reference is now made to FIG. 10, wherein another embodiment of the fastening arrangement according to the invention is shown with reference to a radial section view. To avoid unnecessary repetition, only the differences to the embodiment shown in FIGS. 1 and 2 will be explained and otherwise reference is made to the statements there.

Accordingly, the inner rotor 4 is not clamped in the axial direction by a clamping nut with the camshaft 9, but instead by a peripheral weld seam 50 with the end section 10 of the camshaft 9. The control valve 12 is secured in the axial direction by the securing ring 33 held in the cavity 11 in a ring groove 34.

The fastening arrangement according to the invention thus advantageously allows that detachment or loosening of the clamping nut of a central screw connection is effectively counteracted for the axial clamping of the camshaft adjuster with the camshaft, in order to guarantee, in particular, an exact positioning of the driven part relative to the camshaft. The measures explained above in connection with the different embodiments for achieving this goal can be realized alone or in any combination.

LIST OF REFERENCE SYMBOLS

1 Fastening Arrangement
2 Rotary Piston Adjuster
3 Outer Rotor
4 Inner Rotor
5 Gearwheel
6 Rotational Axis
7 Side Component
8 Axial Opening
9 Camshaft
10 End Section
11 Cavity
12 Control Valve
13 Valve Housing
14 Control Piston
15 End Surface
16 Valve Tappet
17 Electromagnet
18 Helical Compression Spring
19 Sleeve
20 Pressurized Medium Connection
21 Non-return Valve
22 Spiral Spring
23 Clamping Nut
24 Threaded Section
25 Outer Threading
26 Inner Threading
27 Shoulder
28 Support Surface
29 Head Part
30 Ring Part
31 Breakthrough
32 Contact Surface
33 Securing Ring
34 Ring Groove
35 Pressurized Medium Channel
36 Collar
37 Ring Section
38 Support Section
39 Transition Section
40 (Camshaft) Deformable Section
41 Clamping Nut Collar
42 Friction Disk
43 (Camshaft) Ring Groove
44 (Inner rotor) Deformable Section
45 Conical Section
46 Fastening Tab
47 Tab Receptacle
48 Wedge Groove
49 Wedge Ring
50 Weld Seam

The invention claimed is:

1. A fastening arrangement for fastening a camshaft adjuster to a camshaft, comprising: a drive part that can be brought into drive connection with a crankshaft, a driven part that is locked in rotation with the camshaft and is supported for rotation relative to the drive part, and an adjustment mechanism that is adapted to adjust a rotational angle position between the drive part and driven part, wherein the driven part is provided with a central, axial opening penetrated by an end section of the camshaft, the end section has a thread-bearing threaded section that is screwed together with a clamping nut to load the driven part so that the driven part and the camshaft are clamped in an axial direction to provide a rotationally locked connection, and the clamping nut is configured to compress elastically in the axial direction or to release tension in the axial direction, so that loosening of the clamping nut is counteracted, wherein the driven part is clamped in the axial direction by the clamping nut with a support surface formed by the camshaft, and the end section of the camshaft is provided with a truncated-cone-shaped conical section that is arranged between the support surface and the threaded section and on which the driven part sits, wherein there is a connection element connecting the clamping nut and the end section of the camshaft to each other in a rotationally fixed manner.

2. The fastening arrangement according to claim 1, wherein an elastically deformable body is arranged between the clamping nut loading the driven part and the driven part.

3. The fastening arrangement according to claim 2, wherein the elastically deformable body is connected rigidly to the clamping nut.

4. The fastening arrangement according to claim 2, wherein the elastically deformable body is produced from spring steel.

5. The fastening arrangement according to claim 1, wherein the clamping nut itself is formed as an elastically deformable body.

6. The fastening arrangement according to claim 5, wherein the clamping nut is a sheet-metal shaped part.

7. The fastening arrangement according to claim 1, wherein the end section of the camshaft is provided with a deformable section that is arranged between the support surface and the threaded section and is constructed so that the deformable section deforms elastically when the clamping nut is tightened.

8. The fastening arrangement according to claim 7, wherein the deformable section of the camshaft has a smaller wall thickness than adjacent camshaft sections.

9. The fastening arrangement according to claim 1, wherein the driven part is provided with a deformable section adjacent to the clamping nut and the deformable section is constructed so that it deforms elastically when the clamping nut is tightened.

10. A fastening arrangement of a camshaft adjuster comprising: a drive part that can be brought into drive connection with a crankshaft, a driven part supported so that it can rotate relative to the drive part, and a hydraulic adjustment mechanism that can adjust a rotational angle position between the drive part and driven part in which the driven part is provided with a central axial opening penetrated by an end section of the camshaft, the driven part is welded with the camshaft and wherein the hydraulic adjustment mechanism comprises a control valve that is held in a cavity of the end section of the camshaft and has a valve housing and a control piston held so that it can be displaced in the axial direction in this valve housing, and wherein the valve housing is secured in the axial direction by a securing ring held in a ring groove of the end section.

11. A fastening arrangement for fastening a camshaft adjuster to a camshaft, comprising: a drive part that can be brought into drive connection with a crankshaft, a driven part that is locked in rotation with the camshaft and is supported for rotation relative to the drive part, and an adjustment mechanism that is adapted to adjust a rotational angle position between the drive part and driven part, wherein the driven part is provided with a central, axial opening penetrated by an end section of the camshaft, the end section has a thread-bearing threaded section that is screwed together with a clamping nut to load the driven part so that the driven part and the camshaft are clamped in an axial direction to provide a rotationally locked connection, the clamping nut is configured to compress elastically in the axial direction or to release tension in the axial direction, so that loosening of the clamping nut is counteracted, and the driven part is clamped in the axial direction by the clamping nut with a support surface formed by the camshaft, the end section of the camshaft is provided with a truncated-cone-shaped conical section that is arranged between the support surface and the threaded section and on which the driven part sits, and a friction element enhancing friction is arranged between the clamping nut and the driven part.

12. The fastening arrangement according to claim 11, wherein the adjustment mechanism comprises a hydraulic control valve that is held in a cavity in the end section of the camshaft and has a valve housing and a control piston held in the housing for movement in the axial direction, and the valve housing is secured in the axial direction by a securing ring held in a ring groove of the end section.

13. The fastening arrangement according to claim 11, wherein the adjustment mechanism comprises a hydraulic control valve that is held in a cavity in the end section of the camshaft and has a valve housing and a control piston held for displacement in the axial direction in the valve housing, and the valve housing is secured in the axial direction by a radial collar of the clamping nut.

* * * * *